United States Patent
Jordan, Jr.

(10) Patent No.: US 7,748,161 B1
(45) Date of Patent: *Jul. 6, 2010

(54) METHOD AND APPARATUS FOR PERIMETER PEST CONTROL

(76) Inventor: John Jeremiah Jordan, Jr., 2349 Walker Dr., Lawrenceville, GA (US) 30043

( * ) Notice: Subject to any disclaimer, the term of this patent is extended or adjusted under 35 U.S.C. 154(b) by 98 days.

This patent is subject to a terminal disclaimer.

(21) Appl. No.: 11/964,383

(22) Filed: Dec. 26, 2007

Related U.S. Application Data

(63) Continuation-in-part of application No. 11/697,723, filed on Apr. 7, 2007, and a continuation-in-part of application No. 11/551,691, filed on Oct. 20, 2006, and a continuation-in-part of application No. 11/460,539, filed on Jul. 27, 2006, now Pat. No. 7,464,499.

(51) Int. Cl.
 *A01M 7/00* (2006.01)
(52) U.S. Cl. .................. 43/132.1; 43/107; 52/101
(58) Field of Classification Search ............... 43/132.1, 43/107, 58, 124, 121; 52/101
 See application file for complete search history.

(56) References Cited

U.S. PATENT DOCUMENTS

| | | | | |
|---|---|---|---|---|
| 2,012,651 A | * | 8/1935 | Beall | 43/124 |
| 2,149,495 A | * | 3/1939 | Barnard et al. | 52/101 |
| 2,859,487 A | * | 11/1958 | Tonnon et al. | 52/101 |
| 2,905,072 A | * | 9/1959 | Oswald | 454/276 |
| 3,513,586 A | * | 5/1970 | Gushue et al. | 43/124 |
| 4,648,202 A | * | 3/1987 | Renth | 43/132.1 |
| 5,097,641 A | * | 3/1992 | Hand et al. | 52/101 |
| 5,303,523 A | * | 4/1994 | Hand et al. | 52/101 |
| 5,378,086 A | * | 1/1995 | Campbell et al. | 405/229 |
| 5,802,779 A | * | 9/1998 | Hulls et al. | 52/101 |
| 5,918,427 A | * | 7/1999 | VanderWerf | 52/100 |
| 6,088,950 A | * | 7/2000 | Jones | 43/124 |
| 6,205,718 B1 | * | 3/2001 | Murphy et al. | 52/101 |
| 6,474,031 B2 | * | 11/2002 | Phillips | 52/302.1 |
| 6,966,143 B2 | * | 11/2005 | Allen | 43/124 |
| 7,603,816 B1 | * | 10/2009 | Hohmann, Jr. | 52/101 |
| 2002/0139060 A1 | * | 10/2002 | Contreras et al. | 52/101 |
| 2004/0163332 A1 | * | 8/2004 | Raymond | 52/101 |
| 2008/0295446 A1 | * | 12/2008 | Kennedy et al. | 52/741.3 |

* cited by examiner

*Primary Examiner*—Christopher P Ellis
(74) *Attorney, Agent, or Firm*—Sanford J. Asman

(57) ABSTRACT

The method and apparatus include an elongated pesticide administration system is designed to fit between the foundation wall of a structure and the lowest portion of an exterior wall system, such as aluminum siding, vinyl siding, real or artificial stucco, or stone. The elongated seal is attached to the bottom surface of the exterior wall system, and it includes an extended, flexible, resilient seal which seals it against the outside of the foundation wall, thereby creating a pest treatment zone between the foundation wall and the lowest portion of said exterior siding material. Pesticide foam is injected into the pest treatment zone through holes which are spaced along the bottom of the seal or which extend through the exterior siding. The pesticide foam fills the pest treatment zone to provide perimeter protection.

5 Claims, 2 Drawing Sheets

METHOD AND APPARATUS FOR PERIMETER PEST CONTROL

CROSS-REFERENCE TO RELATED APPLICATIONS

The present application is a continuation-in-part of U.S. application Ser. No. 11/460,539, entitled PERIMETER PEST CONTROL SYSTEM, filed Jul. 27, 2006; a continuation-in-part of U.S. application Ser. No. 11/551,691, entitled PERIMETER PEST CONTROL SYSTEM FOR USE ON BRICK STRUCTURES, filed Oct. 20, 2006; and a continuation-in-part of U.S. application Ser. No. 11/697,723, entitled METHOD AND APPARATUS FOR PERIMETER PEST CONTROL, filed Apr. 7, 2007 by the present inventor, all by the present inventor, the priority of which are claimed, and the contents of which are hereby incorporated by reference.

BACKGROUND OF THE INVENTION

The present invention relates to a method and apparatus for sealing the lower portion of an exterior wall system which also acts as a chemical (termiticide and/or pesticide) application appliance and to a method for applying chemicals to a structure. In particular, the present invention is intended to be used both to mechanically seal the exposed area created at the lower portion of the exterior walls of a structure, such as a residence, while simultaneously providing a means for facilitating the injection of chemicals (termiticides and/or pesticides) between the inner and outer portions of the exterior wall system, thereby providing a perimeter pest control system which extends around the periphery of the structure.

In the past there have been efforts to provide chemical (termiticide and/or pesticide) treatment to protect structures at the time that they are constructed. While it has been common practice in the construction of new buildings to pre-treat the fill or soil area which is to underlie the foundation with a termiticide, the initial termite barrier does not last indefinitely, so there is a need to supplement this barrier during the life of the building by providing an efficient and inexpensive means at the points where termites or other insects can gain access to wooden structural members. While termites do not bore holes through concrete, they can gain entry into the areas where wood is used in the construction of the building by forming earthen tunnels from ground level over the surfaces of concrete foundations, slabs, and walls. A common problem in buildings clad with exterior surfacing materials such as lap siding, which includes, but is not limited to wood, cement-fiber, composites, vinyl, and aluminum, is that even if the siding itself is made of a material which resists rotting, cracking, damage from rain or hail, or insect penetration, the exterior board siding is installed in lapped layers over the exterior portion of the internal wall structure, whereby an exposed area is formed behind the lowest board, e.g., between the rear (inner) surface of the lowest board and the outer surface of the foundation wall, which would permit insects to climb from the ground up and gain access to the structure via the exposed area. For example, even such popular construction materials as cement board siding, e.g., those sold by James Hardie Building Products, called "Hardie Board", while themselves impervious to insect penetration, permit insects to gain access in the exposed area formed behind the lowest board.

In particular, termites are able to build tunnels in the tiny spaces between the walls and the surfacing material, and their tunneling activity will not be detected because it is behind the cement board exterior surfacing material. Thus, while the exterior surfacing material will prevent termites or other insects from gaining access through them, the lack of a seal between the exterior portion of the internal structural wall and the interior portion of the exterior surfacing material provides a path through which termites or other insects can enter the structure from behind the exterior surfacing material.

This situation can be made worse if landscaping activities decrease the vertical space between the ground and the upper portion of the foundation wall following construction which make it even easier for termites and other insects to gain access by climbing up the edges of a foundation slab and between the structural walls and the exterior siding material without being detected until after severe damage has been done to wooden structural members of the building.

Prior methods for preventing termites and other insects from entering between the structural walls and the exterior siding material involve saturating the soil adjacent to the perimeter of the structure with chemicals (termiticides and/or pesticides) at the point of termite entry. This is accomplished by trenching or rodding. In the first of these methods, a trench is dug around the perimeter and filled with termiticide, e.g., at the rate of about four gallons of chemical (termiticide and/or pesticide) per linear foot of trench. In the other method, chemical (termiticide and/or pesticide) is injected through a hollow rod jammed into the soil and against the foundation about every six inches or so. Usually the soil adjacent the foundation is relatively dry. Since dry soil does not absorb liquids easily, it is not uncommon for chemicals (termiticides and/or pesticides) applied in this manner to drain away very quickly, thereby making it ineffective at the point of termite or insect entry, and, instead, creating an environmental detriment to the surrounding soil. Further, these methods are quite labor intensive, so they are costly to use. Thus, there has been an ongoing need for an efficient, labor-saving chemical (termiticide and/or pesticide) delivery system for providing an effective perimeter pest control system to create a barrier between the exterior cladding of a building and its foundation and exterior structural walls, whereby the area between them can be sealed from insect intrusion while also providing a means for easily treating the structure on a periodic basis.

While a number of fluid distribution systems for chemicals (termiticides and/or pesticides) comprised of conduit capable of emitting chemicals through apertures or valves have been developed for incorporation in or under a building foundation, these prior systems are typically quite elaborate in construction, requiring extensive modification of traditional and conventional building methods, expensive pumps and reservoirs, and substantial increases in building costs. Such issues have been previously noted, for example, in U.S. Pat. No. 3,513,586 to Meyer et al. which discloses and teaches a distribution system comprising tube means disposed within a building footer constructed of conventional concrete building blocks, requiring additional support members and plate members, among other things, that but for the distribution system, would not be required as part of the footer.

U.S. Pat. No. 3,209,485 to Griffin discloses a pesticide distribution system comprised of multiple, independent, branched circuits, intended to be installed within and under a foundation at the time of construction. The system comprises many parts, and its installation requires multiple steps at different stages of construction of the building.

U.S. Pat. No. 3,602,248 to Peacock discloses a distribution system comprised of a plurality of parallel connected pipe branches, each branch thereof short enough so that fluid pressure is maintained along the entire piping, with at least two inlets into each branch. Each branch requires a closure fitting at the end opposite the inlet end. Multiple pumps are required to maintain uniform pressure in the branch lines.

There are also a number of related systems for distributing pesticide within the walls of buildings. In U.S. Pat. No. 3,676,949 of Ramsey, pipes with emitter nozzles pass through the studs of the walls with a nozzle disposed between each set of studs. In U.S. Pat. No. 3,782,026 of Bridges et al., pipes extend within the walls or, alternatively, beneath baseboard moldings on the interior walls, permitting injection of insecticide gas within the walls. In U.S. Pat. No. 4,028,841 to Lundwall an insecticide storage and pressurizing system is installed in the attic, and perforated pipes carry pest control fluid into the building walls, while U.S. Pat. No. 4,742,641 to Cretti describes a built-in reservoir which is installed within a building wall from which pesticide is distributed whenever the pump is operated (which can be done by a timing device for injecting predetermined amounts at predetermined spaced intervals).

U.S. Pat. No. 3,330,062 to Carter is another pest control system utilizing pipes installed through holes drilled through the wall studs of a building with the pipes requiring threaded caps at their distal ends. U.S. Pat. No. 4,944,110 to Sims relates to a method for applying pesticide into the concealed areas of a building, by injecting pressurized chemicals through perforated preinstalled tubing. U.S. Pat. No. 5,347,749 to Chitwood et al. discloses a system for reapplication of termiticide to the fill dirt underlying the foundation slab of a building at potential termite entry points: junction of foundation block with slab, and openings in the slab for penetration of bundles of utility connections.

While none of the foregoing patents teaches or discloses a system adapted to deliver a termiticide barrier to the exterior walls of a building underneath its surface coating or siding materials, an effort to disclose such a system was made in U.S. Pat. No. 5,819,466 to Aesch, et al., in which a peripheral termiticide delivery system using flexible apertured tubing was described. That system was designed to simply saturate the exterior foundation walls of a new structure, with the treatment going down to the soil.

U.S. Pat. No. 6,301,849 which issued to Roth describes a flashing article used to seal out moisture and to drain moisture away from a stucco coated exterior wall surface. In order to provide chemical treatment, the article uses one or more tubes, an internal conduit, and connectors, all of which prevent the article from being made as an extruded item. Further, the installation of the article is considerably more labor intensive than would be desirable, as each installation requires custom fitting the article to each wall section of the structure. In addition, the flashing overlies the lower portion of the exterior wall which prevents a good seal without caulking, which adds yet another complexity and expense to the installation. Notably, if the caulk seal between the outer surface of the flashing and the structure were to fail, the flashing would actually act like a gutter system, and funnel water under the exterior wall system, thereby creating potential damage to the exterior wall system and introducing moisture between the exterior and interior wall systems.

SUMMARY OF THE INVENTION

In that no combination of the known prior art devices provides a means for accomplishing the results of sealing the exposed area between the foundation and the exterior wall system while providing an efficient, easily installed and easily used, means and method for termiticide and/or pesticide treatment the need for such a system is met by the present invention.

The present invention is an elongated article designed to be used in a structure having an exterior surface made of aluminum siding, vinyl siding, real or artificial stucco, or stone. The invention is designed to be installed directly below the siding, and it attaches to both the underside of the exterior siding and the outside of the foundation. The invention includes an elongated internal aperture having fill ports formed at spaced intervals along its exterior portion, means for sealing the article against the foundation wall formed along the side intended to abut the foundation wall, and a flexible seal formed along the upper portion which is designed to facilitate sealing the article to the lower edge of the exterior siding. The invention thereby provides an elongated sealing and delivery apparatus through which pesticides or termiticides can be introduced to provide a continuous chemical barrier against ground source pest infestation while simultaneously sealing the exposed area between the foundation and the exterior wall system.

In various embodiments, the cross-section of the inventive apparatus is modified such that the seal, which is preferably made of a material, such as flexible polyvinyl chloride ("FPVC"), is able to be flexibly attached against the lower surface or the exterior siding.

The present invention further includes a method for perimeter pest control in a structure having a siding material which is affixed to the inside wall and foundation of the structure at the lowest point of the siding material. The method comprises the steps of providing a sealing apparatus to substantially seal the space between the lower portion of the siding material and the outer portion of the foundation wall to thereby form a pest treatment zone between the lower portion of the siding material and the outside of the foundation wall, with the pest treatment zone being formed within the sealing apparatus. The method further includes forming a series of injection openings which allow communication from outside of the pest treatment zone into the pest treatment zone, and then injecting an insecticide (or termiticide) through the openings into the pest treatment zone.

DETAILED DESCRIPTION OF THE PREFERRED EMBODIMENTS

Figure 1:
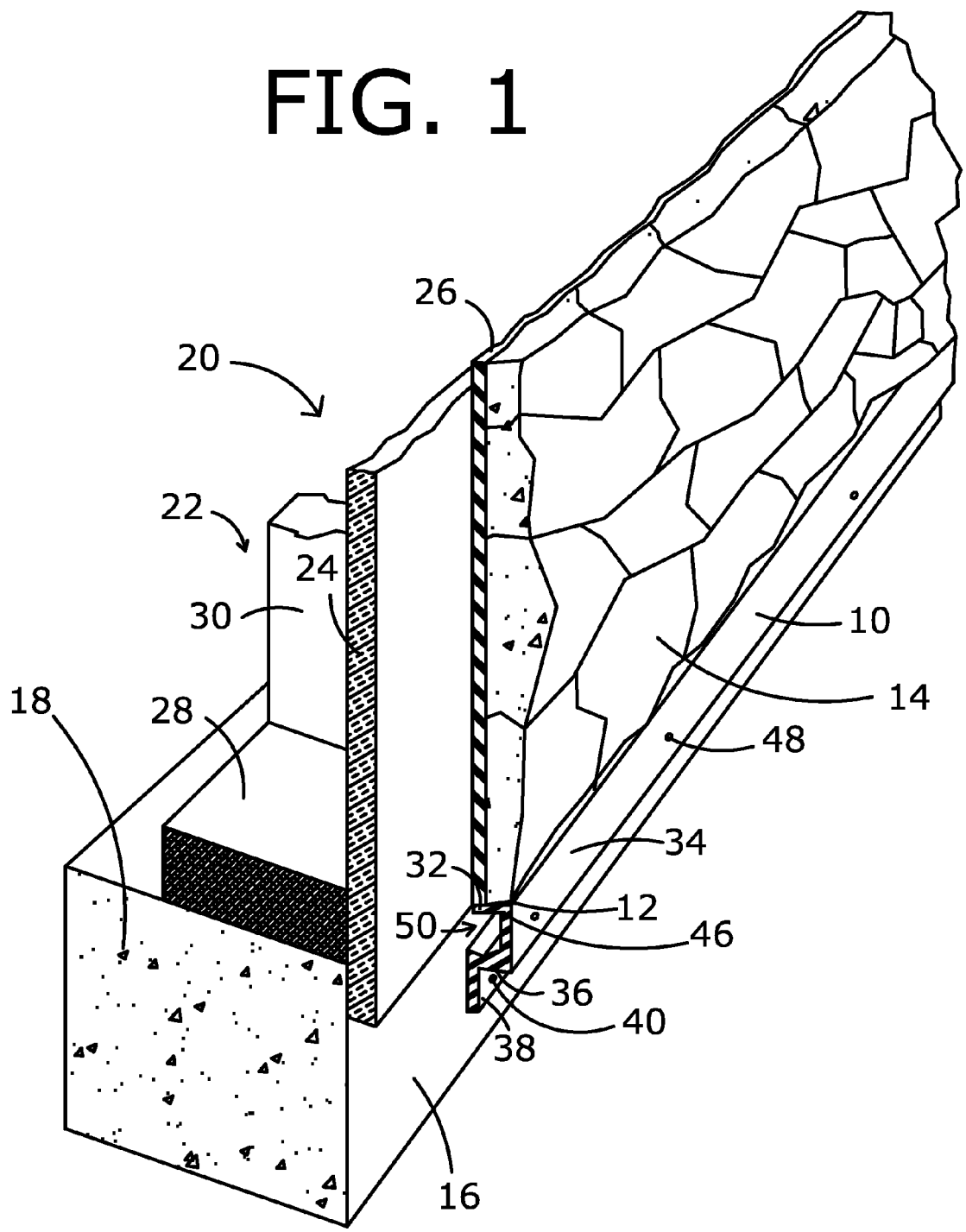
FIG. 1 is a perspective view of an exterior wall system to which the apparatus of the first embodiment of the present invention has been attached.
Figure 2:
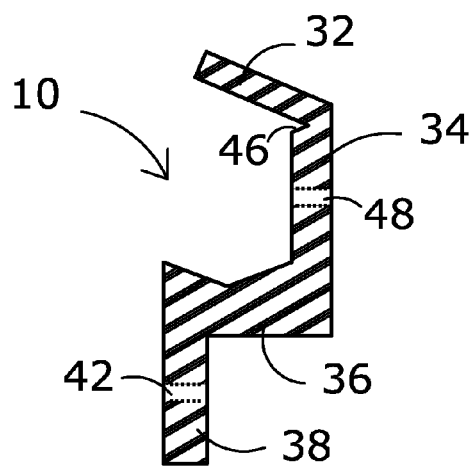
FIG. 2 is a side cross-sectional view of the first embodiment of the invention of FIG. 1 further illustrating the manner in which the article looks when it is formed.
Figure 3:
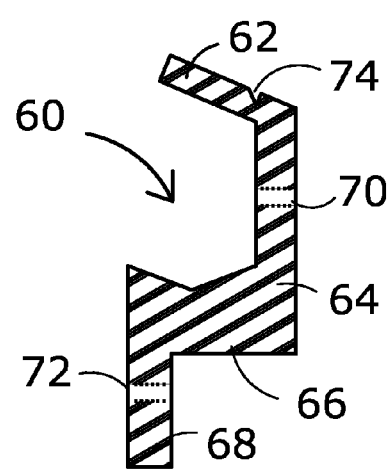
FIG. 3 is a side cross-sectional view of a second embodiment of the invention.
Figure 4:
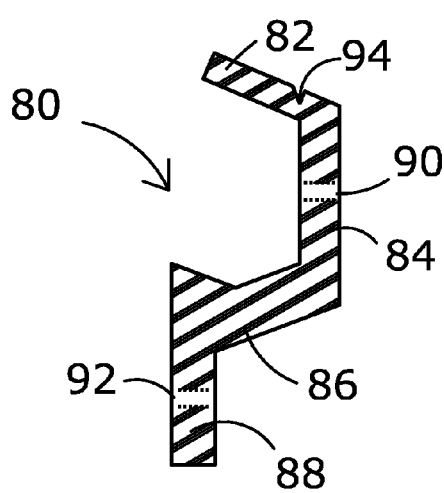
FIG. 4 is a side cross-sectional view of a third embodiment of the invention.
Figure 5:
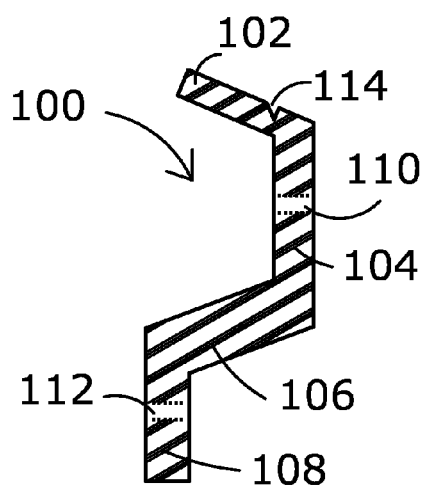
FIG. 5 is a side cross-sectional view of a fourth embodiment of the invention.

Referring first to FIGS. 1 and 2, the present invention relates to an apparatus 10 designed to be used as a pesticide or termiticide application appliance and to a seal the exposed area formed beneath the lower surface 12 of an exterior wall made of a material such as aluminum siding, vinyl siding, real or artificial stucco, or stone, such as the stone wall 14 and the exterior surface 16 of the foundation 18 of a structure 20, as illustrated. The structure 20 further includes a structural wall system 22 including a sheathing layer 24 and an outer "wrap" 26. The wall system 22 further comprises wood "sill" members 28 and vertical members, such as stud 30, to which the exterior "sheathing" 24, which is typically foam, particle board, or plywood, is attached, with the wrap 26 overlying the sheathing 24, as shown.

The appliance 10 is preferably manufactured using an extrusion process whereby the elongated appliance 10 will have a substantially sickle shaped cross-section, with an upper wall 32, an outer wall 34, a lower wall 36, and a lower extension 38, as shown. As shown in FIG. 1, the upper wall 32 acts as a means for sealing the appliance 10 against the lower portion 12 of the stone exterior wall 14. Similarly, the lower extension 38 is used to seal the appliance 10 against the outside wall 16 of the foundation 18, using a series of screws 40 (See, FIG. 1) which extend through holes 42 (See, FIG. 2) formed in the appliance 10. A "V"-shaped cut 46 in the appliance 10 acts as a "flap hinge" to facilitate the top wall 32 to act like a seal. A series of openings 48 act as injection ports through which insecticides or termiticides can be injected into the open space 50 formed between the outer foundation wall 16 and the inside of the upper, outer, and lower walls 32, 34, 36 of the appliance 10.

With reference to FIGS. 2-5, alternative embodiments 60, 80, 100 of the appliance 10 are shown in cross-section. In each case, the alternative embodiments 60, 70, 80 include an upper wall 62, 82, 102, an outer wall 64, 84, 104, a lower wall 66, 86, 106, and a lower extension 68, 88, 108, respectively, whereby each of the embodiments 10, 60, 80, 100 can operate in the same manner as was explained above with respect to the first embodiment 10, shown in FIG. 1. Similarly, each embodiment includes screw holes 70, 90, 110 and injection ports 72, 92, 112. However, as shown the configurations of the respective bottom walls 66, 86, 106 can differ, as can the locations of the "V" shaped hinges 74, 94, 114.

Each of the embodiments 10, 60, 80, 100 is designed to have an overall height of about 2.125 inches prior to installation, so that when they are installed they can be compressed against the lower portion of the outer wall such that their overall height is decreased to about 1.875 inches. However, these dimensions are not critical. Similarly, they each have a nominal width of about 0.875 inches, which can preferably be in the range of about 0.5 to 1.0 inches.

The general overall manner in which the present invention 10 is used and installed has been described. In order to manufacture the invention, one would preferably use a flexible material which can be formed using an extrusion process. While the particular material is subject to variation depending upon environmental, and other, factors, materials which have been found to be suitable include various types of plastic composites, LPDE, and industrial vinyl, such as flexible polyvinyl chloride ("FPVC"). Advantages of FPVC are that it can be produced in clear or various colors, it is paintable, and it can have mold and mildew retardants incorporated into it during production. Also, the material is flexible, within the durometer range of about 70 to about 90.

While the invention may be formed by extrusion, it has been found to be preferable for shipping, storage, and other purposes to limit the length of each extrusion to about 8 feet, whereby the lengths may be stored without bending which makes their handling, storage, and installation easier, although longer or shorter lengths could be formed.

In order to use the apparatus 10 following its installation, one injects a foamed pesticide through the pesticide fill ports 48, whereby a treated zone 50 is formed beneath the outer wall 14 and between the appliance 10 and the foundation wall 16.

The use of the inventive apparatus has resulted in an inventive method for providing perimeter pest control for use in a structure having a siding material which is not spaced horizontally from the inside wall and foundation of the structure at the lowest point of the siding material. The method comprises the steps of providing a sealing apparatus to substantially seal the space between the lower portion of the siding material and the outside of the foundation wall to form a pest treatment zone between the lower portion of the siding material and the outside wall of the foundation, with the pest treatment zone being formed between the sealing apparatus and the foundation wall. As used herein, the term "pest treatment zone" is intended to refer to an area into which chemicals, including both termiticides and pesticides, can be injected. The method further includes forming a series of injection openings which allow communication from outside of the pest treatment zone into the pest treatment zone, and then injecting an insecticide (or termiticide) through the openings into the pest treatment zone.

The present invention can be installed on existing structures or new construction, and it is intended to allow a pest control service company to periodically apply a uniform chemical barrier around the exterior of a home or other structure in an area which protects the chemical (termiticide and/or pesticide) against degradation from exposure to the elements. It also minimizes the amount of chemical that would come in contact with the exterior of the building. As will be understood by those skilled in the art, the invention can be used with any type of aluminum siding, vinyl siding, real or artificial stucco, and on stone siding.

The present invention can be used as a stand-alone pest control treatment, or it can be used in conjunction with other traditional pest or termite treatment products and protocols. Its design allows for the application of pesticide or termiticide without requiring entry into the home, so it is not necessary to schedule treatments only when someone can be present to provide access.

Although the system creates a mechanical barrier against infestation of pests, such as termites and other insects, the primary effectiveness of the invention is determined by the efficacy of the chemical used in the system. In that regard, various chemicals (termiticides and/or pesticides) can be used. One which has been used in a foam supplied through the use of a portable foam generator of the type produced by NPD Products Limited (formerly NoHowe Product Development Ltd.) of Midhurst Ontario and described in U.S. Pat. No. 6,755,400 to Howe, using their ProFoam Platinum product, has been Termidor, although other types of chemicals (termiticides and/or pesticides), such as those made by Dupont or FMC, could also be used in any suitable foam carrier.

While there are industry distinctions between "pesticides" and "termiticides" those skilled in the art will recognize that the present invention, described herein, can be used with any pesticide or termiticide which can be injected through it in a foam carrier as described above. As the efficacy of the treatment will be determined by the specific chemical (termiticide and/or pesticide) which is used, the present invention should be regarded as an appliance which makes such treatment possible. Accordingly, nothing in the descriptions set forth above should be regarded as limiting the use of the present invention to either a pesticide or a termiticide, or to any particular pesticide or termiticide.

While the invention has been described in connection with specific embodiments and applications, the inventors do not intend to restrict the description to the examples shown. Persons skilled in the art will recognize that the above methods may be modified or changed without departing from the general scope of this description. The inventors also intend to include all such modifications and alterations in so far as they come within the scope of the appended claims or the equivalents thereof.

I claim:

1. A pest control system comprising:
   (a) an elongated structure having a size and configuration adapted to permit it to fit between a foundation wall of a structure and the underside of the lowest portion of an exterior wall system, without overlying either (i) the outside of said exterior wall system, or (ii) the top portion of said foundation wall, said exterior wall system being of the type which has a space between its lowest portion and the exterior wall of an inner wall system which overlies said foundation wall;
   (b) means for sealing said elongated structure solely against a vertical portion of said foundation wall and against the lowest portion of said exterior wall system;
   (c) means for attaching said elongated structure between said vertical portion of said foundation wall and said inside of said lowest portion of said exterior wall thereby forming a pest treatment zone between said elongated structure and said foundation wall; and
   (d) means for permitting the injection of a pesticide or termiticide containing foam into said pest treatment zone.

2. The pest control system of claim 1 wherein said elongated structure further comprises an elongated flap for sealing said elongated structure against said foundation wall.

3. The pest control system of claim 2 wherein said elongated structure further comprises an elongated seal for sealing said elongated structure against the lowest portion of said outer wall.

4. A method for providing perimeter pest control in a structure having an external siding which has an inside wall which is spaced from an outside wall of an interior wall system and a foundation having a vertical outside wall, comprising the steps of:
   (a) forming a seal at the lowest portion of said external siding, said seal being adapted to abut said lowest portion of said external siding and to enclose the space between said seal and said vertical outside wall of said foundation, thereby forming a pest treatment zone between said vertical outside wall of said foundation and the interior side of said outside wall;
   (b) forming a series of injection openings which allow communication from outside of said pest treatment zone into said pest treatment zone; and
   (c) injecting a pesticide through said openings into the said pest treatment zone.

5. The method of claim 4 wherein said step of forming a series of holes includes forming said holes through said seal.

* * * * *